(No Model.) 2 Sheets—Sheet 2.

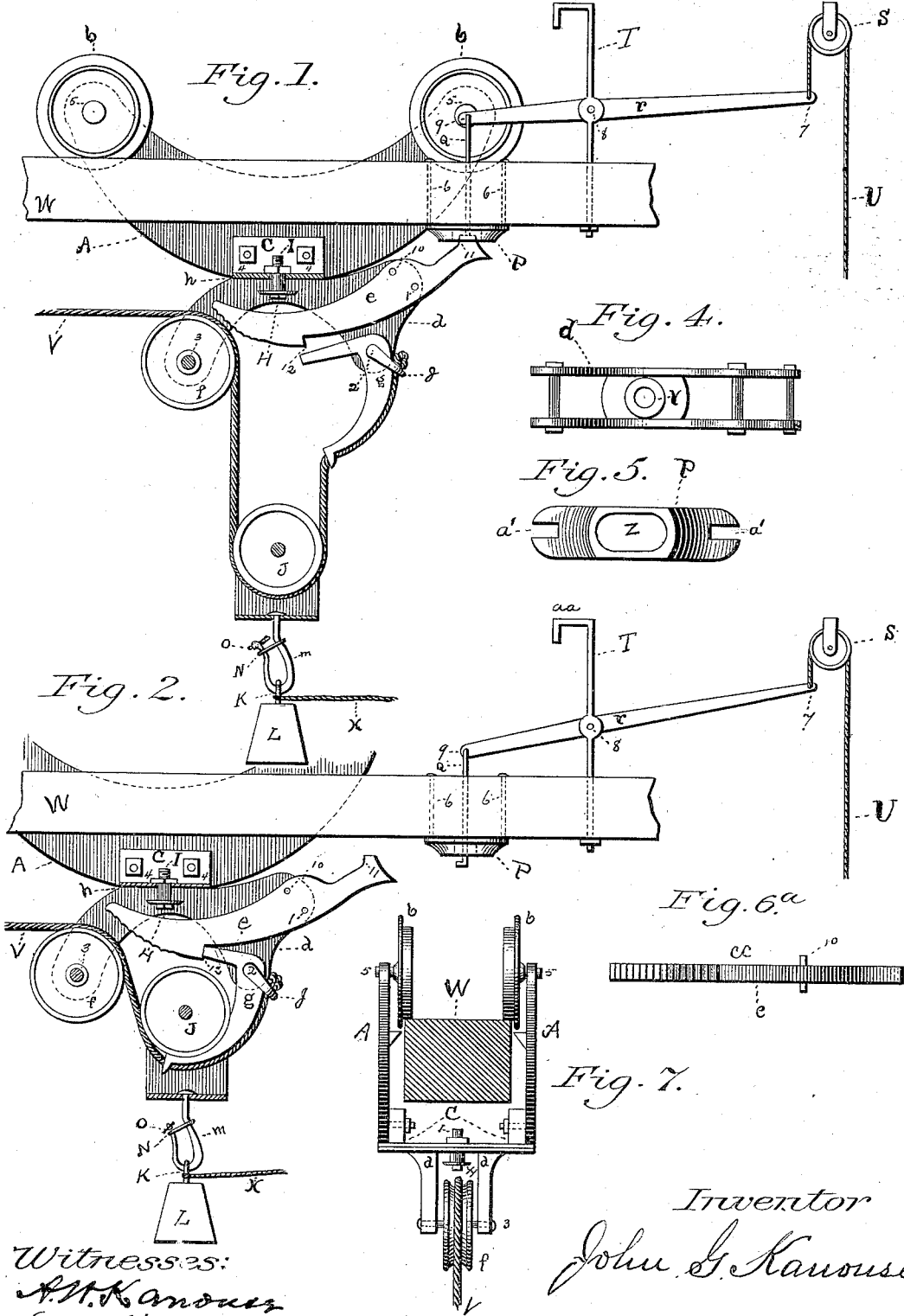

J. G. KANOUSE.
HAY CARRIER.

No. 330,983. Patented Nov. 24, 1885.

Witnesses:
A. N. Kanouse
E. D. Kanouse

Inventor:
John G. Kanouse

UNITED STATES PATENT OFFICE.

JOHN GEORGE KANOUSE, OF APPLETON, WISCONSIN, ASSIGNOR OF TWO-THIRDS TO RICHARD MILLER AND WILLIAM POLIFKA, BOTH OF SAME PLACE.

HAY-CARRIER.

SPECIFICATION forming part of Letters Patent No. 330,983, dated November 24, 1885.

Application filed June 6, 1885. Serial No. 167,912. (No model.)

*To all whom it may concern:*

Be it known that I, JOHN GEORGE KANOUSE, a citizen of the United States, residing at Appleton, in the county of Outagamie and State of Wisconsin, have invented certain new and useful Improvements in Hay-Carriers; and I do hereby declare that the following is a full, clear, and exact description of the invention, which will enable others skilled in the art to which it appertains to make and use the same.

Heretofore hay-carriers have been so constructed as to necessitate elevating the load to be conveyed to the carrier before the locking device would operate and allow the carrier to pass from the catch-iron.

The object of my invention is to handle hay or other commodity in large or small quantity, to elevate it any height desirable, and carry it to a place of deposit, the carrier being allowed to move in a horizontal direction at any time in the process of elevating the load at the will of the operator. I attain these objects by the mechanism illustrated in the accompanying drawings, in which—

Figure 3:
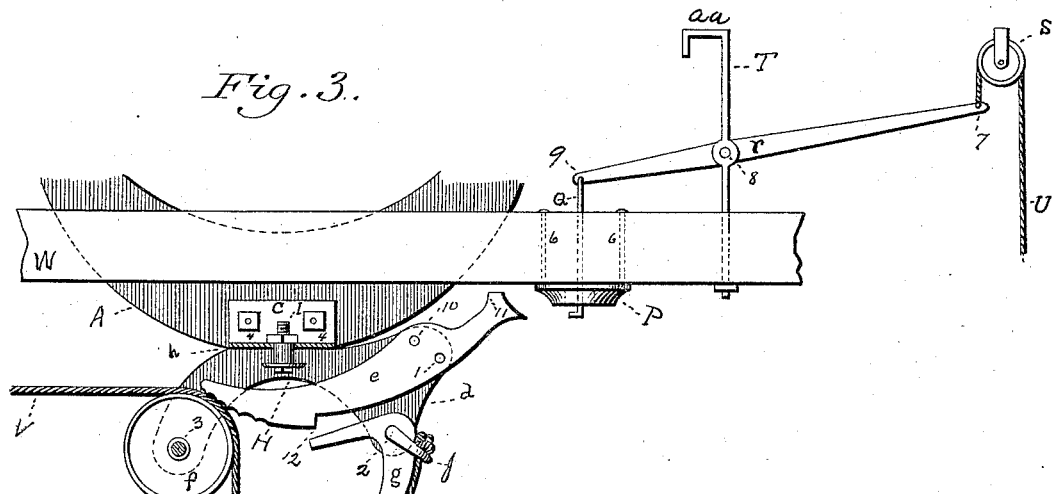
Figure 6:
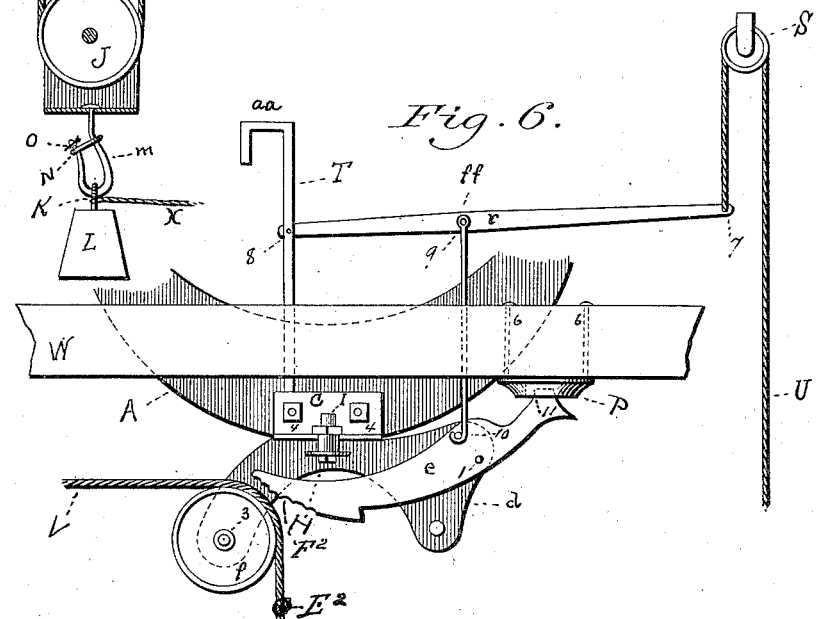

Figure 1 is a side view of the carrier on the rail, with one side broken away, showing the relation of the parts when in position to raise the load. Fig. 2 is substantially the same as Fig. 1, with side and wheels broken away, and showing the parts in their different relative positions as conveying the load horizontally, when elevated, to the carrier, the locking device working automatically, the load resting on the arched dog and independent of the draft-rope. Fig. 3 is substantially the same as Fig. 2, showing the relation of the parts as the carrier moves horizontally, being freed or unlocked from the catch-iron by the hand or controllable trip, sustaining the load by the draft-rope, and elevated only part way to the carrier, and showing the relation of the parts of the hand or controllable trip as having unlocked the carrier from the catch-iron. Fig. 4 is a bottom view of the movable yoke. Fig. 5 is a bottom view of the catch-iron. Fig. 6 is a view with the side and wheels broken away and curved dog removed, with the draft-rope hitched directly to the load, no pulley being used below the carrier, and a modification of the controllable trip, as shown in Figs. 1, 2, and 3, and showing the relation of the parts when the carrier is locked to the catch-iron. At C C, Fig. 6ª, is a bottom view of the dog *e*. Fig. 7 is an end view of carrier as moving on the rail.

Similar letters refer to similar parts throughout the several views.

Small letters refer to movable parts and figures to bolts and rivets.

W is the rail, supported by hooks T, which are secured to the rail midway between its sides and extend up and are hooked over collar-beams or suitable irons in the ridge or roof of the mow.

A is the side plate of the carrier, to which are pivoted the wheels *b b*, and to which is bolted the disk C.

*b b* are the wheels, pivoted to the side plate, A, at 5 5.

C is a disk, provided with upward-extending arms and downward-projecting thimble, the arms being bolted or otherwise fastened to the side plates, A, at 4 4, and the thimble passing through the upper portion of the yoke *d* at *h* far enough to admit of a washer being secured to it.

*d* is a yoke provided with a hole in its upper side, through which is inserted the thimble of disk C at *y*, and to which are bolted the dogs *e* and *g* and pulley *f*.

H is a washer furnished with a hole of sufficient size to accept of the bolt I, and which is brought in contact with the lower end of the thimble of disk C, and secured to it by means of said bolt I, thus forming a suitable turning device for the depending parts of the carrier.

I is a bolt or pin passing through the washer H and thimble of disk C at *h*, rigidly uniting said washer and thimble.

*e* is a dog, which is bolted to the yoke *d* at 1, and provided at its upper end with a notch to engage with the catch-iron P, and at its lower end with a concave corrugated surface to clamp the rope V, and on its lower arched surface at 12 with a notch to engage with the upper end of dog *g*. Said dog *e* is also provided with a pin or lug at 10 to engage with the pin or shaft Q, as shown in Fig. 6.

*g* is an arched dog, provided with an eye at its lower end to receive the draft-rope V, and having its upper end so shaped as to engage with the notch at 12 in dog *e*. It is bolted to the yoke *d* at 2.

*f* is a pulley over which the rope V passes, and it is bolted to yoke *d* at 3.

*j* is a clevis hinged to the yoke *d* at 2, and through which the draft-rope V is made to pass.

J is a pulley through which the rope V passes, and provided with a hook, *m*, over which is placed a link, N, which is secured to said hook by the key O, which passes through a hole in the outer end of said hook *m*, thereby forming a safety-lock, by means of which the pulley J is securely fastened to the load L, which is to be elevated and conveyed.

L represents the load to be carried.

X is the trip-cord, which is used to loose the load at its place of deposit, and by means of which the carrier is returned to the catch-iron P.

V is the draft-rope, passing over the pulley *f*, through the pulley J, the eye of dog *g*, and the clevis *j*, and to which the power is applied to raise and convey the load L.

At *a a*, Figs. 1, 2, and 3, is shown my controllable tripping device. By preference I make it as herein described, but it may be arranged as shown in Fig. 6, or made to impinge upon the dog *e* by means of a spring or compound levers.

*r* is a lever bolted to hook T at 8, and at 9 to pin Q, its long arm being furnished with a hole at 7 to receive the rope or cord U.

T is a hook made fast to the rail at its lower end, and hooked over a collar-beam or suitable iron in the ridge or roof of the barn, and to which the lever *r* is bolted at 8.

U is a cord attached to lever *r* at 7, and passing over pulley S extends downward, by means of which said lever *r* is actuated.

P is a catch-iron secured to the rail W by bolts at 6 6, to which the carrier is locked over the load L to be elevated and carried, and provided with a hole at Z, Fig. 5, through which the pin Q is made to pass; also, with a notch to receive the upper end of dog *e*, and with a slot in either end, in which bolts are placed in securing it to the rail. Said slots are shown at *a' a'*, Fig. 5.

At Y, Fig. 4, is a hole in yoke *d*, provided to receive the thimble of disk C.

Having thus described my invention, when the parts are in the position shown in Fig. 1, it will be seen the dog *e* is engaged with the catch-iron P, thus locking the carrier securely over the load which is to be raised and conveyed. When in this position, the lower end of dog *e* is raised from the draft-rope V by its upper notched end being slightly lowered when forced into the notch in catch-iron P. As the power is applied to the draft-rope V the load L is raised, and if the carrier is allowed to work automatically the load will be elevated to the carrier, and the pulley J, which is attached to said load, will be rolled up and onto the arched dog *g*, and by the continuous draft on rope V the lower end of dog *g* will be drawn forward and up, while the upper end of said dog will be moved upward and back and made to impinge upon the under curved surface of dog *e* and finally engage in notch 12, thus raising the lower end of said dog *e*, and by means of which the upper notched end will be forced down, and the carrier will be allowed to pass off from the catch-iron P, and as the upper end of dog *g* is now engaged with dog *e* at notch 12 the load is suspended on said dog *g* by means of the pulley J, thus relieving the strain on the draft-rope V; or, as shown in Fig. 6, where the rope V is hitched directly to the load to be raised, and should the carrier be allowed to work automatically, the knot E² is brought in contact with the lower arched surface of dog *e* at F², thereby forcing said lower portion of dog *e* upward, while the upper notched end of said dog is by this movement forced downward, freeing it from the catch-iron P, thus allowing the carrier to move horizontally, and the load L being sustained by the clamping of the rope V at F², as hereinbefore described.

Should the operator desire to unlock the carrier from the catch-iron P, with the load elevated only part way to the carrier, and convey it horizontally, a slight pull on the cord U raises the long arm of the lever *r*, as shown in Fig. 3, when the short arm of said lever will move downward, and in this movement cause the pin Q to impinge on the notched end of dog *e*, and forcing it out of the notch in catch-iron P, allow the carrier to move in a horizontal direction; and as the upper notched end of dog *e* moves out of catch-iron P it becomes freed, and its lower corrugated end at once, by means of its weight, descends upon the draft-rope V, clamping it to the pulley *f*, thereby sustaining the load, as shown in Fig. 3; and as the cord U is allowed its slack the long arm of lever *r*, by its weight, will move down, being hinged at 8, and the short arm of said lever will by the same movement be brought up, and, being hinged at 9 to pin or shaft Q, will cause said pin to move vertically and assume the position shown in Figs. 1 and 2; but as shown in Fig. 6, which is a modified view of my controllable tripping device, the lever *r* is raised by the cord U, as described and shown in Fig. 1, and the pin Q is made to lift on the dog *e* by impinging on the lugs at 10 or, if desired, instead of the lever *r* the cord U may be attached to the upper end of pin Q at *f f*. By preference I use the lever as described, and by impinging on said lug at 10 the dog *e* is made to assume the same position, in the process of unlocking, as hereinbefore described, when the carrier becomes freed from the catch-iron P and moves horizontally along the rail, the load being sustained by the dog *e*, clamping rope V at F², as shown in Fig. 3.

At *c c*, Fig. 6, is shown a bottom view of dog *e*. At 10 are shown the lugs on which the pin Q is made to act in unlocking the carrier from the catch-iron P, as hereinbefore described.

In returning the carrier to the catch-iron P, which is done by drawing on the cord X, the notched end of dog *e* is brought in contact with the catch-iron P, and said dog being hinged by a bolt to the yoke *d* at 1, the notched end thereof is forced down as it enters the notch in catch-iron P, and thus the lower corrugated end is raised from the rope V, as shown in Fig. 1; or, in case the carrier has worked automatically, as shown in Fig. 2, then the lower portion of said dog *e*, being raised by the notched end thereof entering the catch-iron P, as hereinbefore described, the upper end of the curved dog *g* will become disengaged with dog *e* at notch 12, and the pulley J is then allowed to return to the operator preparatory to attaching another load, the carrier being locked securely to catch-iron P, as shown in Figs. 1 and 6.

Having thus fully described my invention, what I claim, and desire to secure by Letters Patent, is—

1. In a hay-carrier, the combination, with the rail W, the wheels *b b*, the side plates, A, the disk C, the yoke *d*, the dogs *e* and *g*, the washer H, and bolt I, of the hand or controllable trip arranged to unlock the carrier from the catch-iron P, substantially as shown and described.

2. In a hay-carrier, the dog *e*, provided with a notch at 11 and 12, with a lug at 10, with a concave corrugated surface at its lower end, and supported by the yoke *d* at 1, substantially as and for the purpose named.

3. In a hay-carrier, the combination, with the yoke *d*, the dogs *e* and *g*, and pulley *f*, of the bolt I and washer H, adapted to secure yoke *d* to the thimble of disk C, substantially as shown and described.

4. In a hay-carrier, the combination, with the rail W, the wheels *b b*, the side plates, A, the yoke *d*, the pulleys *f* and J, the dogs *e* and *g*, the washer H, and bolt I, of the disk C, furnished with a thimble arranged to engage with yoke *d*, washer H, and bolt I, substantially as and for the purpose set forth.

5. A controllable trip arranged to move a pin or shaft through the rail of a hay-carrier, in which movement said pin or shaft, when in contact with a dog arranged to engage with a catch, allows said dog to pass out of the catch, thereby freeing the carrier, substantially as shown and described.

In testimony whereof I have signed my name to this specification in the presence of two subscribing witnesses.

JOHN GEORGE KANOUSE.

Witnesses:
F. E. HARRIMAN,
ALBERT C. HIPP.